Nov. 29, 1949 W. W. GARSTANG 2,489,372
MULTIPHASE VIBRATOR AND VIBRATOR SYSTEM
Filed Aug. 31, 1946 3 Sheets-Sheet 1
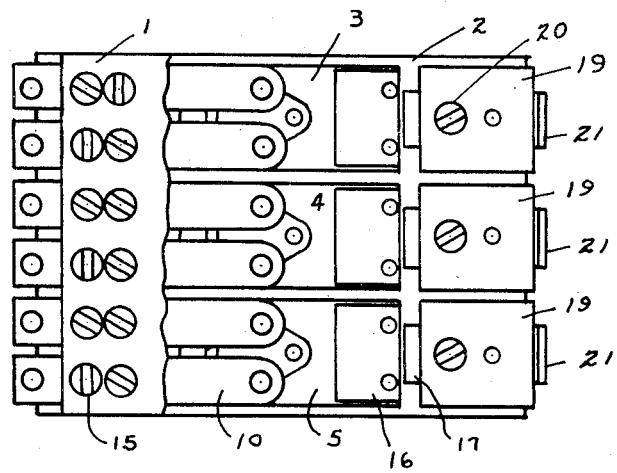
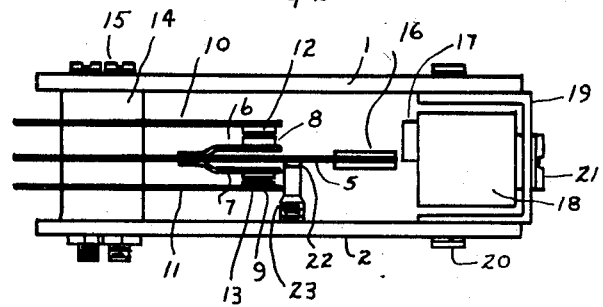
INVENTOR
WILLIAM W. GARSTANG
BY *W. P. Hahn*
ATTORNEY INVENTOR
WILLIAM W. GARSTANG
BY W. P. Hahn
ATTORNEY Patented Nov. 29, 1949

2,489,372

UNITED STATES PATENT OFFICE 2,489,372

MULTIPHASE VIBRATOR AND VIBRATOR SYSTEM

William W. Garstang, Indianapolis, Ind., assignor, by mesne assignments, to Cornell-Dubilier Electric Corporation, South Plainfield, N. J., a corporation of Delaware Application August 31, 1946, Serial No. 694,312

11 Claims. (Cl. 321—43)

1

The present invention relates to improvements in vibratory switches and vibratory switch control circuits.

It has for one of its objects the provision of a vibratory switch including a multiplicity of vibratory switch members driven by suitable means, each one of said switches being driven by a separate driving element such for instance, as an electromagnet and means for effecting the sequential or successive operation of said switches in a definite order.

Another object of my invention is to provide a circuit arrangement for the control of the driving magnets of a plurality of vibrating switches, whereby said driving magnets will be successively or sequentially operated in a definite or predetermined order to effect a sequential driving of said switches for controlling various types of electrical circuits.

Another object of my invention is to provide an electrical system, wherein I am enabled to deliver from a suitable source of direct current a three phase alternating current to a load.

Another object of my invention is the provision of a vibrator controlled electrical system, wherein I am enabled to deliver from a suitable source of low voltage direct current a relatively higher voltage of direct current and wherein the ripple in said high voltage direct current is reduced to a minimum.

Other objects and advantages of my invention will appear more fully hereinafter in the accompanying specification and claims.

For the purpose of illustrating my invention, I have illustrated in the accompanying drawings certain embodiments thereof. In said drawings Fig. 1 is a side elevation of a vibrator switch embodying my invention;

Fig. 2 is an end elevation thereof;

Figure 3:
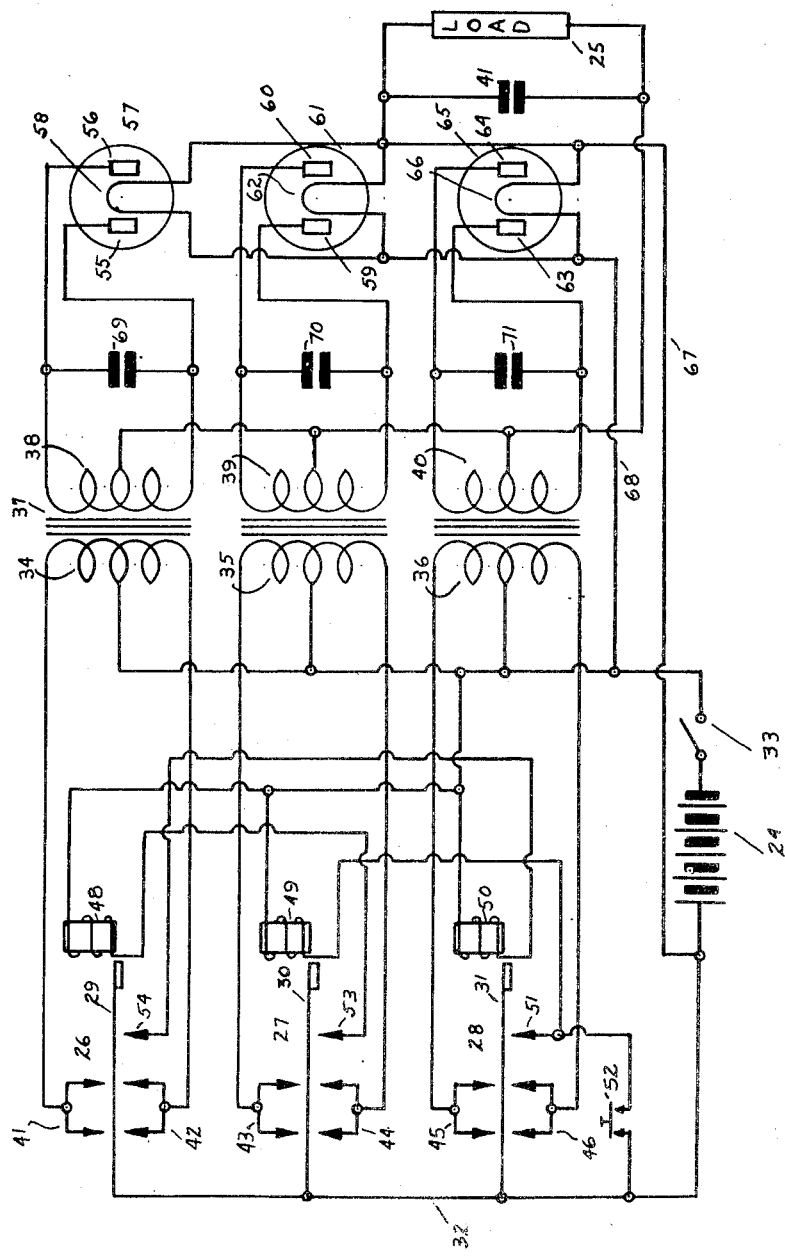
Fig. 3 is a diagrammatic view of a circuit arrangement, embodying my invention, for delivering an increased direct current voltage to the load from a source of relatively low direct current.

In the vibratory switch illustrated in Figs. 1 and 2, I have provided a pair of side members 1 and 2 providing a frame structure in which are supported a plurality, three, vibrating switch members 3, 4 and 5. Each of these switch members is of the same construction, so that it is only necessary to describe a single switch member and its associated contacts.

2

The switch member 5 carries on opposite sides contact carrying fingers 6 and 7 supporting respectively contacts 8 and 9. The vibratory switch member 5 vibrates between a pair of contact carrying arms 10 and 11, respectively carrying contacts 12 and 13. The vibrating reed 5 and the contact carrying arms 10 and 11 are supported and insulated from one another by suitable insulation blocks or spacers 14 secured in position by bolts 15 extending through the side members and through the spacer blocks. The bottom ends of the reed and contact carrying arms extend beyond the spacer blocks and if desired, beyond the bottom of the side pieces 1 and 2 to provide terminals for connection with suitable conducting wires.

The reed 5 carries at its upper end an armature 16 arranged in close proximity to, but to one side of the center of, a polepiece 17 of a driving magnet 18. The driving magnet is preferably supported in position through the medium of a U-shaped support 19, the side legs of which extend parallel with the side frames 1 and 2 and are secured thereto by screws or bolts as 20. The magnet 18 is supported on the frame through the means of a suitable screw 21, which extends through the U-shaped support 19 and into the polepiece 17.

A driving contact 22 is mounted on the reed 5 which is adapted to cooperate with a stationary contact 23 mounted on the side member 2 for controlling the driving circuit of the winding of the magnet 18.

In the structure illustrated, I have provided three vibrating switch members, the vibrating members of each of which is driven by a separate driving magnet and according to an embodiment of my invention, the circuit of the next succeeding driving magnet is controlled by the vibrating switch member of the preceding vibrating switch.

The circuit arrangement for accomplishing the above is more fully illustrated in the circuit diagram shown in Fig. 3. In the arrangement illustrated in Fig. 3, I provide a control circuit for delivering from a suitable low voltage source of supply, such for instance as a battery 24, a higher voltage direct current to a load 25. To this end, I have provided a vibrator switch of the type illustrated in Figs. 1 and 2, which in effect constitutes three separate vibrating switches 26, 27 and 28. The vibrating reeds 29, 30 and 31 of the respective switches are connected by a conductor 32 to one side of the battery 24. The opposite terminal of the battery 24 is connected through a suitable main switch 33 to the center taps of a plurality of primary windings 34, 35 and 36 of a transformer 37, said transformer having a plurality of secondary windings 38, 39 and 40. One outer terminal of the winding 34 is connected to a pair of relatively stationary contacts 41 of the vibrator 26 and the opposite outer terminal of the winding 34 is connected to a second pair of relatively stationary contacts 42 disposed on the opposite side of the reed 29. Likewise, the outer terminals of the winding 35 are respectively connected to contacts 43 and 44 of the vibrator switch 27, while the outer terminals of the winding 36 are respectively connected to the contacts 45 and 46 of the vibrator switch 28. Accordingly, as the vibrating member vibrates between respective oppositely disposed contacts, the circuit will be closed from the source of supply, the battery 24, through the opposite sections of each of the primary windings to thereby induce an alternating current in the corresponding secondary windings, the ratio of turns between the primary windings and the secondary windings being such that the voltage supplied by the secondary windings is materially higher than the voltage of the source of supply or battery 24.

The coils of the respective driving magnets 48, 49 and 50 for the reeds 29, 30 and 31 have one terminal connected to one side of the battery 24. The opposite terminal of the coil of the magnet 49 is connected to a stationary driver control contact 51, which driver control contact is also connected through a starting switch 52 with the opposite side of the battery 24. The opposite terminal of the coil of the driver magnet 48 is connected to the stationary driver contact 53 and the opposite terminal of the coil of the driver magnet 50 is connected to the driver contact 54.

As a result of the above arrangement, it is to be observed that the reed 30 of the vibrator 27 controls the circuit of the driving magnet 48. The reed 29 of the vibrator 26 controls the circuit of the driving magnet 50 and the reed 31 of the vibrator 28 controls the circuit of the driving magnet 49. Accordingly, the driving magnets will be successively energized, after the magnet 49 has been initially energized through the starting switch 52 for setting up a vibratory movement of the reed 30.

Initially, with the control switch 33 closed, the starting switch 52 is closed, thus energizing the coil of the magnet 49. As soon as the driving magnet 49 is energized, the reed 30 will start to vibrate periodically establishing a circuit for the magnet 48 through the driving contact 53. As soon as the magnet 48 is energized, it will start the reed 29 to vibrating, periodically establishing the driving circuit through the magnet 50, which in turn will cause the reed 31 to vibrate periodically establishing a circuit through the magnet 49. After the apparatus has been initially started, the starting switch 52 may of course be opened. It is thus seen that the driving magnet of one vibrating switch is controlled by the next succeeding vibrating switch so that the circuits of the driving magnets are serially or successively closed. It will be observed that with the frequencies of the reeds 29, 30 and 31 the same, the intermittent opening and closing of the circuit controlled by these reeds is substantially spaced 120 electrical degrees. It is apparent, therefore, that initially we will say the circuit is closed in one direction through the top half of the winding 34 of the transformer. At one half cycle spacing, the circuit will then be closed in the same direction through the top half of the winding 36 and thereafter with the same phase displacement it will be closed through the top half of the primary winding 35. On the backswing of the vibrator, the circuits will be successively closed in the same phase relationship and the same sequence through the lower halves of the windings in the opposite directions. Accordingly, alternating current will be generated in the secondary windings 38, 39 and 40 of the transformer with the same phase displacement and with the voltage materially stepped up.

The three phase current developed above may be used for supplying various loads as for instance, in the structure illustrated in Fig. 3, it is used for supplying a direct current of increased voltage to the load. In the structure illustrated, the respective windings 38, 39 and 40 each has a center tap connected to one side of the load. The outer terminals of the winding 38 are respectively connected to the plates 55 and 56 of a full wave rectifier tube 57, the filament 58 of which is connected to one side of the load 25. Likewise, the outer terminals of the secondary winding 39 are respectively connected to the plates 59 and 60 of a full wave rectifier 61, the filament 62 thereof being connected to one side of the load and in a similar manner, the plates 63 and 64 of the full wave rectifier 65 are connected to the opposite terminals of the secondary winding 40, the filament 66 of this rectifier being also connected to one side of the load.

A heating circuit for the filaments 58, 62 and 66 is established through the conductors 67 and 68 with the battery 24.

It is therefore apparent that the three phase alternating current of the transformer is rectified to deliver a direct current of increased voltage to the load with the ripple reduced to the minimum. Buffer condensers 69, 70 and 71 are connected across the terminals of the secondary windings 38, 39 and 40 and a condenser 41 is connected across the terminals of a load 25, to further reduce a ripple in the current delivered to the load.

Figure 4:
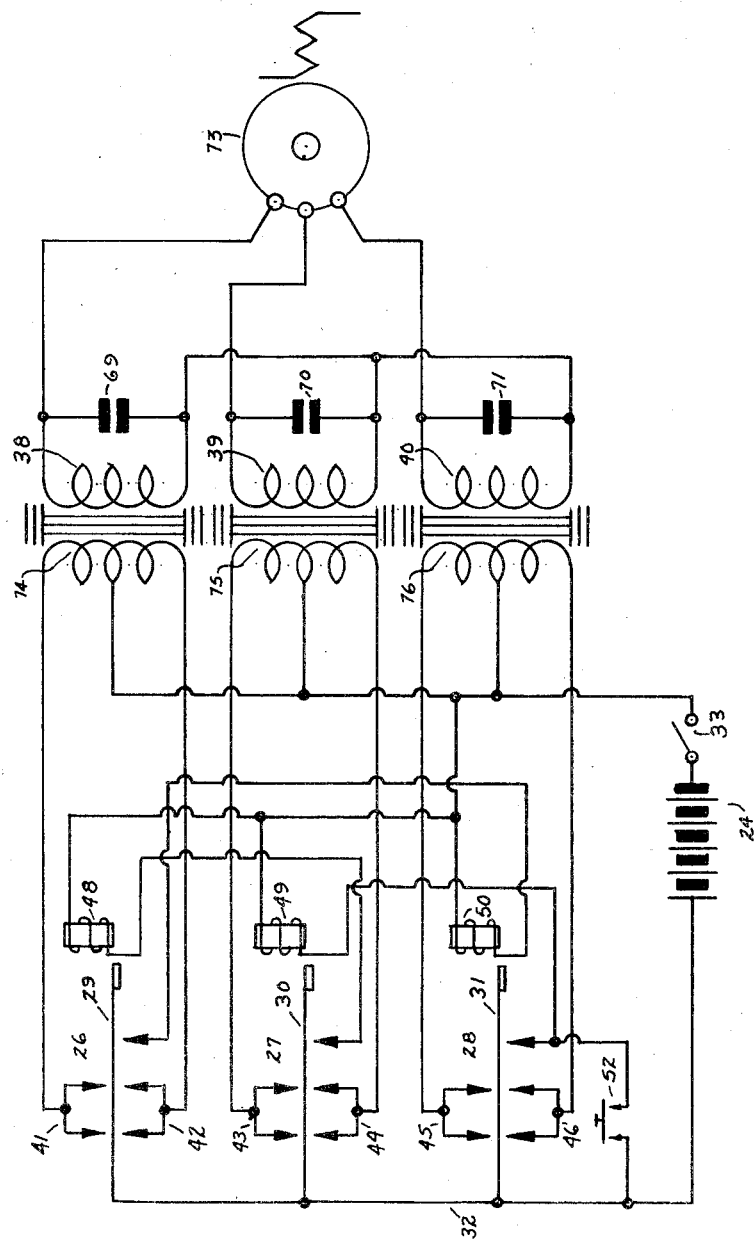
Fig. 4 is a diagrammatic view of a circuit arrangement for delivering a three phase alternating current to a load.

In the structure illustrated in Fig. 4, I have illustrated a circuit arrangement whereby a three phase alternating current may be delivered to a load 73 in the form of a three phase alternating current motor. In this arrangement, the current from the battery 24 is delivered to the three primary windings 74, 75 and 76 of a leakage reactance transformer in the same manner as it is delivered from the battery in the arrangement illustrated in Fig. 3. However, in this arrangement, the secondary windings are connected to the terminals of the three phase rotary motor and accordingly, a three phase alternating current is delivered for the operation of the motor.

It will be noted that with the vibrator driven sequentially, as provided for in this structure, the alternating current cycles will be spaced 120 electrical degrees apart.

It is also to be observed that while I have shown the sequential driving of three vibrating switches, the sequential driving in the same manner of any number of vibrating switches may be effected for obtaining other results than those disclosed in the accompanying drawings.

I claim as my invention:
1. In combination, a plurality of vibratory interrupters each comprising a vibratory contact member mechanically independent of the other contact members, relatively stationary contact members disposed on the opposite sides of said vibratory contact members and a driving magnet, and means for effecting the operation of the vibratory members of said interrupters in a predetermined sequence comprising a circuit controlling switch for each of said magnets independent of said oppositely disposed contact members and operated by one of the other of said vibratory contact members and intermittently opening and closing the circuit of the magnet controlled thereby.

2. In combination, three vibratory interrupters, each comprising a vibratory contact member mechanically independent of the other vibratory contact members, relatively stationary contacts disposed on the opposite sides of said vibratory members, a first driving magnet for driving the first vibratory member, a second driving magnet for driving the second vibratory member and a third driving magnet for driving the third vibratory member, a circuit controlling switch for said first driving magnet independent of said oppositely disposed contacts operated by the second vibratory contact member, a circuit controlling switch for said second driving magnet independent of said oppositely disposed contacts operated by said third vibratory contact member, and a circuit controlling switch for said third driving magnet independent of said oppositely disposed contacts operated by said first vibratory contact member.

3. In combination, a plurality of vibrating interrupters, each comprising a vibratory member mechanically independent of any of the other vibratory members and relatively stationary contacts disposed on the opposite sides thereof and a driving magnet for each of said vibratory members, and means for controlling the circuit of the driving magnet of each interrupter by the vibratory contact member of the next succeeding vibratory interrupter the circuit of the first magnet of the sequence being controlled by the vibratory member of the last vibrating interrupter of the sequence.

4. In combination, a plurality of vibratory interrupters arranged to be operated in a definite sequence, each interrupter comprising a vibratory contact member mechanically independent of any of the other vibratory contact members and at least one relatively stationary contact member cooperating therewith and means for sequentially driving the vibratory contacts of said interrupters comprising means for driving each of said vibratory contacts and means independent of said oppositely disposed contacts controlled by each vibratory contact member for controlling the driving means of each succeeding vibratory member the driving means of the vibratory contact of the first interrupter being controlled by the vibratory member of the last interrupter.

5. In combination, a plurality of mechanically independent vibratory interrupters, each having interrupting contacts for interrupting a supply circuit and an electromagnet for operating the vibratory interrupter, each of said vibratory interrupters having a driver magnet controlling switch for controlling the operation of the driver magnet of the next succeeding switch the driving magnet of the first interrupter being controlled by the driver controlled switch of the last interrupter.

6. In combination, a plurality of vibrating interrupters each including a vibratory contact member mechanically independent of the vibratory contact members of any of the other vibrating interrupters and cooperating circuit controlling relatively stationary contact members and a driver electromagnet, each of said vibratory members having a driver magnet controlling vibratory contact and associated stationary driver magnet contacts and circuit connections between said driver magnet contacts of said vibratory interrupters for effecting the energization of the driver magnet of each vibratory interrupter by the operation of the driver magnet contact members of the next succeeding vibratory interrupter the driver magnet of the first interrupter being controlled by the driver magnet contacts of the last interrupter.

7. In combination, a plurality of vibratory interrupters, each comprising a vibratory contact member mechanically independent of any of the other vibratory contact members, oppositely disposed relatively stationary contacts between which said vibratory contact member operates and a driving magnet for the vibratory contact member, a second relatively stationary contact member associated with the vibratory contact member of each vibratory interrupter and adapted for cooperation therewith, said second stationary contact member of each vibratory interrupter having a circuit connection with the driving magnet of the next succeeding vibratory interrupter and a circuit connection between the stationary contact of the last vibratory interrupter being connected to the driving magnet of the first vibratory member, whereby the successive driving magnets are intermittently and successively energized.

8. In an electrical system for converting a direct current from a source of direct current supply of one voltage into a direct current of a higher voltage, said system including a transformer having a plurality of input winding means, and output winding means for each of said input windings means, and rectifying means connected to each of said output winding means, a vibratory interrupter for each of said input winding means connected to said direct current source of supply and having interrupting contacts for supplying interrupted direct current to each of said input winding means and mechanically independent of the other interrupters, driving means for each of said vibratory interrupters and means effecting the sequential operation of the driving means of the interrupters and comprising means controlled by each of said vibratory interrupters for effecting the energization of the driving means of the next succeeding interrupter.

9. In an electrical system for converting direct current of one voltage from a source of direct current supply into a direct current of a higher voltage including a transformer having a plurality of primary winding means, each having two ends and a center tap and a secondary winding means cooperating with said primary winding means and supplying an alternating current, a rectifier connected to each of said secondary winding means and adapted to supply a direct current to a load, a vibratory interrupter for each of said primary winding means including a vibratory contact member and oppositely disposed relatively stationary contact members, between which the vibratory contact member operates, the outer terminals of the primary winding means being connected to the oppositely disposed relatively stationary contact members of its associated vibratory interrupter and a center tap of the primary winding means being connected to one side of said direct current source of supply, the vibratory contact member of each vibratory interrupter being connected to the other side of said source of supply, a driving magnet for each of said vibratory members and means controlled by each vibratory contact member for controlling the energization of the driving magnet of the next succeeding vibratory interrupter.

10. In an electrical system for converting a direct current of one voltage from a source of direct current supply into a direct current of a higher voltage including a transformer having a plurality of primary winding means with two ends and a center tap and a secondary winding means cooperating with each of said primary winding means and supplying an alternating current, a rectifier connected to each of said secondary winding means and supplying a direct current to a load, a vibratory interrupter for each of said primary winding means including a vibratory contact member and oppositely disposed relatively stationary contact members, between which the vibratory contact member operates, the outer terminals of the primary windings being connected to the oppositely disposed relatively stationary contact members of its associated vibratory interrupter and the center tap of said primary windings being connected to one side of said direct current source of supply, the vibratory members of said vibratory interrupters being connected to the other side of said direct current source of supply, each of the vibratory interrupters having a driving magnet contact controlling the circuit of the driving magnet of the next succeeding vibratory interrupter and cooperating with its associated vibratory contact member for intermittently closing the circuit of said next succeeding driving magnet.

11. In combination, a plurality of mechanically independent vibrator interrupters, each comprising a resilient vibrating contact carrying reed, relatively stationary contact members disposed on the opposite sides of each of said reeds and a driving magnet for each of said reeds, each of said reeds being positively moved in one direction by its driving magnet when said magnet is energized and in a rebound direction by its own resiliency when its magnet is de-energized, a circuit for the driving magnet of each reed, including a contact independent of said oppositely disposed contact members associated with a contact of a vibratory reed driven by another of said driving magnets, said contacts being engageable by the rebound movement of the reed.

WILLIAM W. GARSTANG.

REFERENCES CITED

The following references are of record in the file of this patent:

UNITED STATES PATENTS

| Number | Name | Date |
|---|---|---|
| 998,147 | Allen | July 18, 1911 |
| 2,113,762 | James | Apr. 12, 1938 |
| 2,401,600 | Arnold | June 4, 1946 |
| 2,410,974 | Huetten | Nov. 12, 1946 |

FOREIGN PATENTS

| Number | Country | Date |
|---|---|---|
| 68,702 | Sweden | Aug. 20, 1928 |
| 184,547 | Great Britain | Aug. 3, 1922 |